June 15, 1937.  L. A. RICHARDS  2,084,005
AUTO IRRIGATION SYSTEM
Filed Oct. 25, 1934   3 Sheets-Sheet 1

INVENTOR
LORENZO A. RICHARDS
BY
ATTORNEY

June 15, 1937.  L. A. RICHARDS  2,084,005
AUTO IRRIGATION SYSTEM
Filed Oct. 25, 1934  3 Sheets-Sheet 2
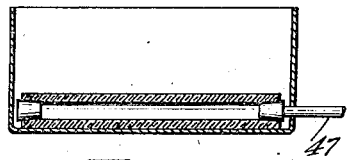
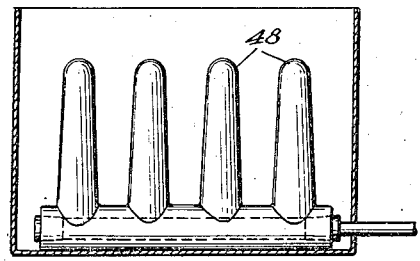
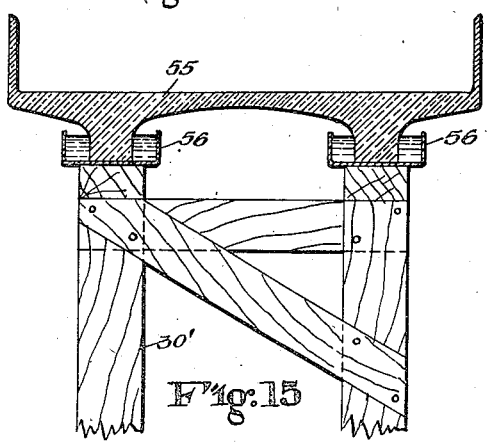
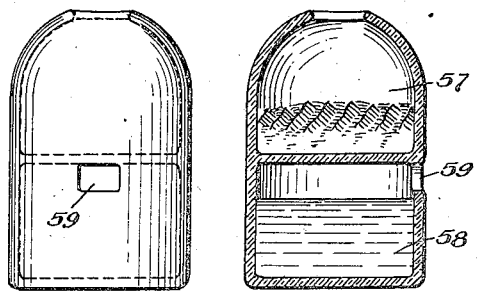
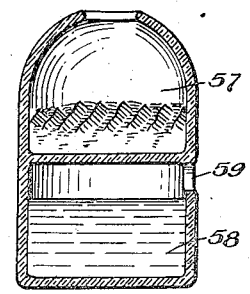
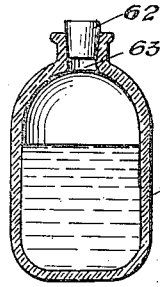
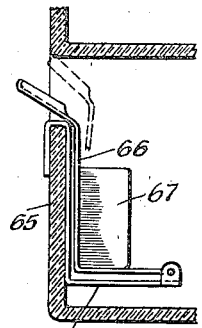
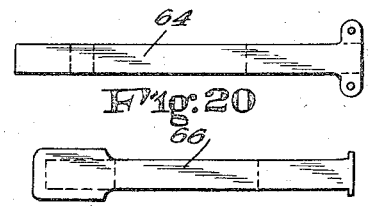
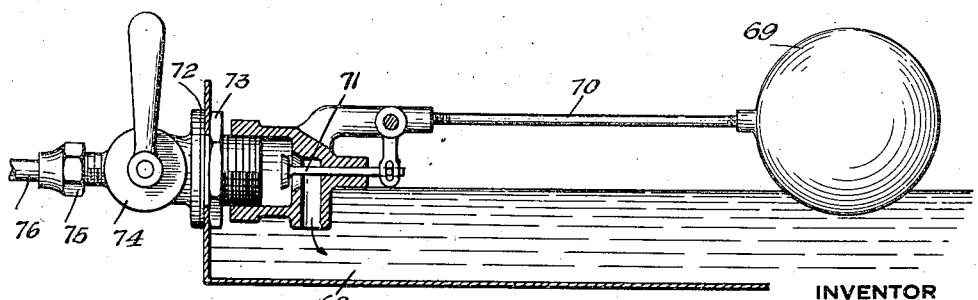
INVENTOR
LORENZO A. RICHARDS
BY
ATTORNEY June 15, 1937. L. A. RICHARDS 2,084,005
AUTO IRRIGATION SYSTEM
Filed Oct. 25, 1934 3 Sheets-Sheet 3
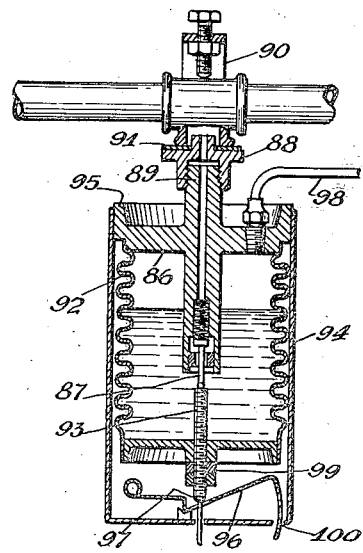
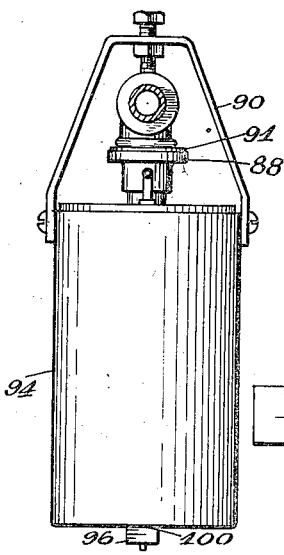
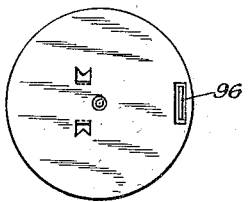
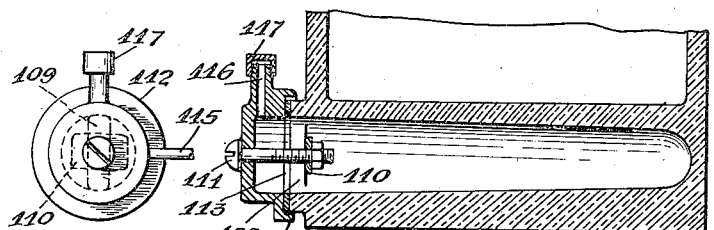
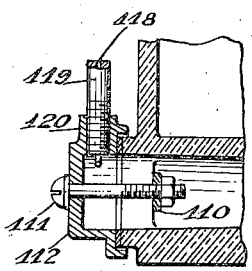
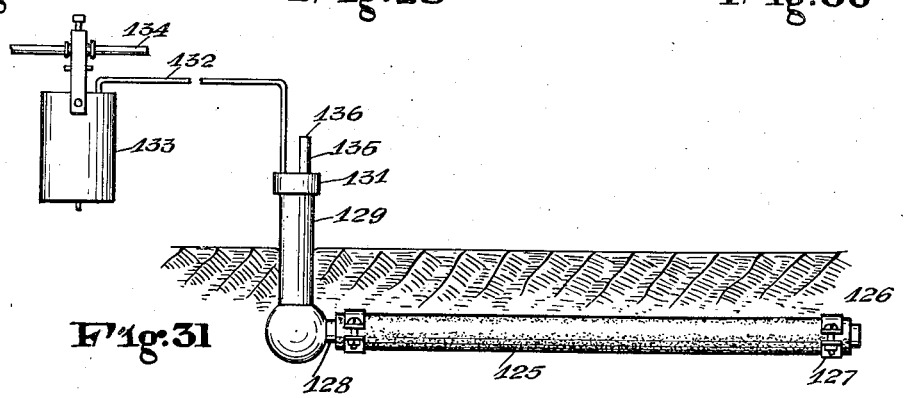
INVENTOR
LORENZO A. RICHARDS
BY
ATTORNEY Patented June 15, 1937

2,084,005

UNITED STATES PATENT OFFICE 2,084,005

AUTO IRRIGATION SYSTEM

Lorenzo Adolph Richards, Ithaca, N. Y.

Application October 25, 1934, Serial No. 749,908

35 Claims. (Cl. 47—48)

My invention which is a continuation in part of my Patent No. 2,023,490, issued December 10, 1935, on application Serial No. 421,326, filed January 16, 1930, relates to novel apparatus for and methods of irrigation and more particularly relates to novel ceramic materials and methods of controlling the flow of fluids therethrough.

In order that my invention may be understood, I provide in the following a brief discussion of capillary action and the forces determining capillary flow through porous mediums, the laws of which I take advantage in carrying out my invention.

The cohesive and adhesive forces acting between molecules are directly responsible for all capillary action. If the work involved in separating a unit area of a liquid from a solid surface is greater than the work required to pull apart a unit area of liquid from liquid, then the liquid will wet or tend to spread over the surface of the solid. It has been found by experiment that many of the minerals found in soils are wetted by water, and it seems certain that this spreading action takes place in most soils.

Surface tension, another property of liquids essential to capillary action, is due to the cohesive force of attraction which the molecules of a liquid exert on each other. Because of the lack of balance of cohesive forces at a liquid surface, molecules of the liquid lying in the surface are pulled toward the body of the liquid. To create new surface requires work because the molecules must be dragged to the surface against the cohesive forces. This fact makes the surface of a liquid tend to shrink so that the area is a minimum; hence, liquids act as if they have a "surface tension". On the basis of these two properties of liquids, it is possible to explain the capillary action of water in porous mediums.

Water, which is brought in contact with a mass of dry soil, spreads over the surface of the soil particles. A thin film is adsorbed on the solid surface, and no longer has the properties of a liquid. Water present in the soil in excess of the amount necessary to supply the adsorbed layer, because of the action of surface tension, tends to collect in small disc- and wedge-shaped bodies in the sharp corners of the pore spaces or where the soil particles are close together. Naturally, the size of these water bodies and the thickness of the liquid films connecting them depend on the amount of water in the soil. It is through this connected configuration, bounded on one side by the adsorbed films in contact with the soil and on the other side by the curved air-liquid interface, that capillary flow takes place.

The motion of this capillary water, like the motion of water in the ocean or in the city water mains, is determined by gravity and the gradient of the pressure in the water. The manner in which surface tension operates to determine the pressure, the pressure gradient and the flow of water in an unsaturated soil is essential to an understanding of my invention, and is discussed in more detail in the following:

In an open vessel containing water, the pressure in the water just under the flat surface is the same as the pressure in the air because the surface tension forces have no components normal to the surface. However, if a liquid surface is curved, there may be a considerable difference in pressure on the two sides of the surface. Thus the pressure in a soap bubble or rain drop is greater than atmospheric pressure, whereas water which is elevated in a small tube due to capillary action has less than atmospheric pressure. At the meniscus there is a resultant outward force due to the effect of surface tension in the curved surface. This will be understood from the following example.

If a rubber diaphragm is stretched across a glass tube, it is necessary to reduce the pressure in the tube to make the diaphragm convex inward. Or, conversely, if the diaphragm is convex inward, the pressure is less on the convex than on the concave side. Likewise, for spherical or cylindrical surfaces forming the boundary between a liquid and a gas, the pressure is always less on the convex side.

In general, it might be said that for the types of curvature occurring in the liquid-gas interface of water in an unsaturated soil, the surface tension forces act in such a direction that the pressure in the soil water is less than atmospheric pressure. As the moisture content of the soil approaches saturation, the capillary pressure in the soil water approaches atmospheric pressure.

The term "capillary tension" is used to refer to the pressure of water in an unsaturated soil. The word "capillary" indicates the nature of the forces acting and "tension" suggests the fact that the pressure is less than atmospheric pressure.

Water-moving forces

In analyzing the factors which are effective in causing water to move through soil, it is unnecessary to consider the molecular forces of adhesion and cohesion. Adhesive forces tend to hold water molecules in place and to prevent motion, except in the initial wetting process, and then they act through extremely short distances only. Cohesive forces acting in the body of the liquid are balanced and of themselves can produce no motion. Gravity, however, affects all mass and may cause to water to move. The only other force acting on a liquid in such a way as to produce a flow is the force arising from a pressure difference.

In a horizontal tube filled with water, if there is no pressure difference at the two ends, there will be no flow; however, if a pressure difference does exist, a flow takes place. If the element of volume is a unit cube, then it is seen that the net force tending to move the volume element along the tube is simply the difference in pressure at the two ends of the cube. In general, it may be said that whenever the pressure in a liquid is not uniform there will be a force set up in the liquid, tending to cause a motion in the direction of the decrease in pressure. The value of this force per unit volume of the liquid is simply equal to the change in pressure per unit distance and always acts in the direction of the decrease in pressure.

Flow or motion of the water, however, does not always occur when a pressure gradient exists. The pressure in such a body of water may have the same value at all points on the same level, but increases with distance down from the surface. Thus, there is a pressure force pushing upward on every element of volume of the water. This change in pressure per unit of vertical distance arises from and is just equal to the weight of unit volume of the liquid. Hence, it is evident that for a liquid at rest under gravity, pressure and gravity forces just balance each other at every point and the resultant water-moving force is zero.

As a generalization it might be said that, in any case, the net force exerted on an element of water is the sum of gravity and pressure water-moving forces. If these forces are balanced, the water element is at static equilibrium. If these forces are unbalanced, then the element is accelerated or attains constant velocity and a frictional force (due to viscosity) has been set up to establish equilibrium. It might be pointed out that the gravity force per unit volume of liquid is always constant in magnitude directed downward, but that the pressure water-moving force may vary both in direction and magnitude, being numerically equal to and in the direction of the greatest rate of decrease in pressure.

It is a common observation that water moves from a wet to a dry soil. In terms of the foregoing, the explanation of this is that there is a higher tension in the capillary water in the dry soil, and the force set up (due to the pressure gradient in the films of capillary water) causes the water to move in the direction of the decrease in pressure or, in other words, in the direction of the increase in tension. In its effect on motion of soil water, gravity force is usually small compared with pressure force; hence, the direction of capillary flow depends largely on the way in which the capillary tension changes from one point to another.

In addition to moisture content, there are several other factors which influence the value of the capillary tension in soil. These are chiefly mechanical composition and state of packing of the soil as well as those factors (such as temperature and dissolved material) which influence the surface tension of the soil water. It is thus seen that the relation between moisture content and capillary tension will be different for different soils. In general, for a fixed capillary tension, the finer the soil and the looser the state of packing, the higher will be the moisture content. For example, in a loam and a clay soil, each with a capillary tension of 15 cm. of mercury, the moisture contents were respectively 20 and 37 percent.

The moisture content of any given soil will remain constant if the capillary tension corresponding to that moisture content is maintained constant.

Capillary properties of porous cells

Before going further into the theory of capillary action in soil, a brief explanation will be given of how porous ceramic cells may be used for the measurement and control of capillary tension. Consider a vessel like that shown in Figure 18 of the accompanying drawings, said cup being made of porous ceramic material.

Such a cup contains numerous interconnected but continuous channels leading from the inside to the outside of the cup. When the cup is dry, these channels permit air to pass freely through the wall. If the cup is filled with water, the capillary-spreading action mentioned earlier causes the water to move rapidly through the wall and fill the pores.

After the wall is saturated, water will continue to flow through pores and on the outside of the wall will move downward under the action of gravity and drip off the bottom of the cup. This flow is in response to both a gravity and a pressure force, the pressure inside the vessel being greater than atmospheric pressure.

If, by means of a vacuum pump, the pressure on the inside of the porous vessel is made less than atmospheric pressure, the direction of flow in the walls will be reversed. This inward flow will continue until the water begins to recede in the pores of the wall. These pores then act like fine capillary tubes, and surface tension tends to keep the water meniscus near the outer surface of the wall. If the size of pores or the pressure difference is sufficient, the liquid will recede to the inner wall and air will bubble through.

However, I have discovered that it is not difficult to make porous walls which, when wet, will support more than an atmosphere difference in pressure without leaking air. In such a wall the curvature of the meniscus at the outer end of the pore adjusts itself until the surface tension can support the pressure difference. The capillary tension in the water films and menisci at the outer surface of the cup is then the same as the water tension inside the cup.

Thus if it is desired to control the capillary tension of water in soil near a porous cell, it is only necessary to supply the cell with water at a controlled tension; the tension of water in the adjacent soil water will approach this same value.

A knowledge of pressure at various points in a piped water system is considered indispensable in order to understand how the water moves. Likewise, in a soil system the moisture flow may be predicted if the value of the capillary tension at various points is known. The same forces, pressure gradient and gravity, are operative in each case. But in the soil, the flow takes place through a large number of small pipes (moisture films), whose effective diameters (thickness) depend upon the amount of water present; the flow takes place in the direction of the resultant water-moving force, which is the vector sum (added by the parallelogram law) of the gravity force and the pressure force.

If flow is defined as that volume of water which in one second crosses unit area perpendicular to the direction of flow, then it has been found that the capillary flow of water is proportional to the water-moving force. That is, for a given soil with a given moisture content, doubling the water-moving force doubles the flow. The proportionality constant involved in this relation may be called the capillary conductivity. It is simply the ratio between flow and water-moving force, or it is the amount of flow caused by unit water-moving force. This factor is a measurement of the readiness with which a soil or any other porous medium transmits water.

I have found that the capillary conductivity varies widely from soil to soil, and for a given soil the conductivity changes rapidly with the thickness of the capillary-conducting films, or in other words, with the moisture content of the soil. For instance, in two greenhouse soils at moisture contents ordinarily used, one had a capillary conductivity twenty-five times as great as the other. For a fine clay it was found that reducing the moisture content from 65 to 40 percent decreased the conductivity nearly a thousand fold.

My measurements indicate that a porous medium has its maximum capillary conductivity when its pore spaces are filled with water, i. e., when it is saturated.

In the course of certain capillary studies I made the discovery that a porous ceramic medium with the proper structure has an important property which may be used to advantage in the design and operation of plant irrigators. I discovered that if a piece of ceramic material having proper composition and structure is brought in contact with water, the pores of the material become filled at the points of contact with the water. Because of the capillary spreading action and pressure gradients which are set up, I found that the region of saturation spreads through the porous medium until the whole piece of ceramic material is saturated with water. I further found that for properly chosen material, it is extremely difficult to draw this water back out of the porous medium by reducing the pressure in the free water in contact with the piece. I found it is possible, however, to control the pressure (less than atmospheric pressure) of the water in the water films and menisci over entire surfaces of the ceramic piece simply by controlling the pressure or tension in the water which is in contact with the ceramic material at one place.

While studying the relation between moisture content and capillary tension in soil, I found it was necessary, of course, to know if and how much the cell weight (without soil) changed with change in the tension of the water, i, e., did the boundary of saturation of the water in the porous wall shift. I found it did not, the boundary of saturation always remaining at the outer surface of the wall. This was exactly what should be expected, since the porous wall was homogeneous and the capillary pores were fine enough even in a thin wall of the material to prevent air leaking at any of the pressures I employed. This latter condition must be satisfied before any porous medium, ceramic or not, will have the so called self-saturating property.

Later, while striving to avoid the manufacturing difficulties inherent with the double walled pot construction, I took advantage of this self-saturating property and the fact that porous mediums when saturated have their maximum conductivity. I was able to combine a wick action with my vacuum controlled porous walled irrigators, thus greatly simplifying construction. The porous walls of my irrigators in addition to the wick function also serve as soil container and support.

Accordingly objects of my invention are to provide auto-irrigator wicks in which are combined: the functions of supporting and surrounding or containing the soil to be irrigated; vacuum controlled auto-irrigator systems; self-saturating high-conductivity qualities of ceramic material; the combination of simplified water supplying and indicating apparatus with irrigators; simplified leak proof methods for making connections to the irrigators and connecting them in series; and a hollow, flexible-walled, non-collapsible, porous irrigator unit.

There are other objects which together with the above consist in the novel features of construction, arrangement and combination of equipment for moisture control to be hereinafter more fully described and claimed, and illustrated in the accompanying drawings in which:

Figure 1:
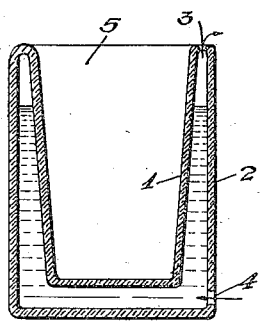
Figures 1 to 5 are cross sections of various modifications of single piece double walled irrigators.

Figures 9, 10 and 13 and 11, 12 and 14 are cross sections and perspective views respectively of removable wick members;

Figure 15 is a cross section of an auto-irrigator system for greenhouse use;

Figures 16 and 17 are elevation and sectional views respectively of a modified form of single piece irrigator;

Figure 18 illustrates an application of my invention for humidifiers;

Figure 19 is a cross section of a water level indicator used in my invention;

Figures 20 and 21 are details of the apparatus shown in Figure 19;

Figures 22 to 30 are views of further modifications of flow pressure control and indication employed in carrying out my invention; and Figure 31 is a view of one form of my system employed for auto-irrigation of an area of land.

Referring to Figures 1 to 5, there are shown single piece, double-walled irrigators with various means for making connection to the water cavity. The pot shown in Figure 1 consists of the double-spaced walls 1 and 2 of which at least wall 1 is made of a ceramic material. An opening 3 at the top provides an outlet for air and an opening 4 at the bottom admits water. The soil to be irrigated is packed in the space 5. Water admitted through 4 at a predetermined pressure fills the space between the walls and flows through the pores of the ceramic material at a rate determined by the soil condition and water pressure as described above.

Figure 2:
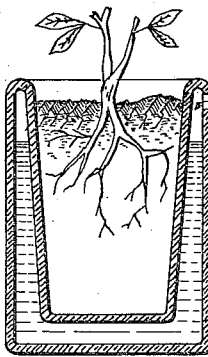

Figure 2 shows a pot of a similar construction of spaced walls with one large opening 6 at the top which serves for both the air outlet and water inlet.

Figure 3:
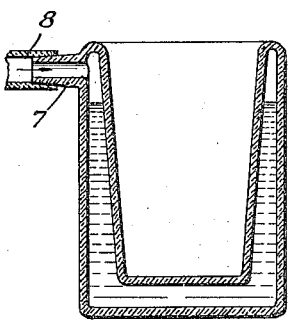

Figure 3 also shows a double walled ceramic pot with a spout 7 so that a water connection can be made thereto by means of a rubber tube 8 or any other suitable means. As shown, the upper surface of the spout 7 is at least flush with the upper edge of the chamber formed for containing the water, thus preventing an air trap.

Figure 4:
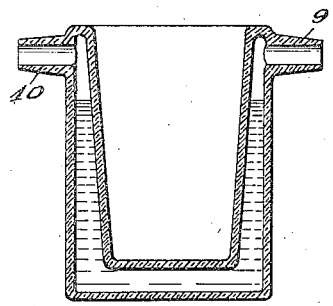

Figure 4 shows a similar pot with two spouts 9 and 10 at opposite sides for the connection of a number of pots in series.

Figure 5:
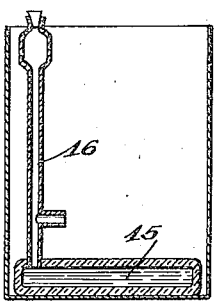

Figure 5 shows a double walled irrigator unit in the form of a flat plate with a chamber 15 for collecting and removing air and a tube 16 for water inlet.

Figure 6:
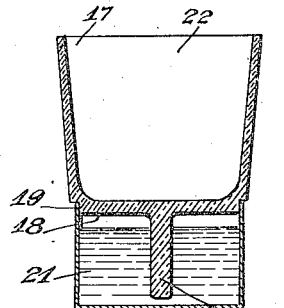
Figures 6 to 8 are cross sections of various modifications of my invention employing the principle of a wick.
Figure 7:
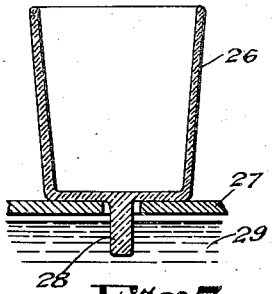
Figure 8:
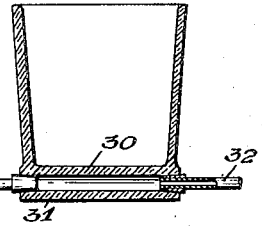

Figures 6 to 8 show irrigator units where the soil container is porous and serves as a wick to supply water from a reservoir. Thus Figure 6 shows a pot for individual operation. The soil container 17 is suitably shaped as by the circumferential flange at 18 so as to fit snugly into the non-porous water container 19. The extension 20 of ceramic functions as a wick to draw water from the reservoir 21 into the soil space 22.

Figure 7 shows an irrigation system, the soil container 26 of which is similar to 17 of Figure 6, but the self-irrigating pots 26 rest on a support 27 which has perforations to receive the wick projections 28 of any number of desired pots. The wick projection 28 extends into the water reservoir 29 and draws water to the soil chamber in the manner described hereinbefore.

Figure 8 shows a self-irrigating soil container with a cylindrical hole through the base as at 30 and 31 provided with a water inlet 33 and water outlet 32. The water is supplied through inlet 33 and is conducted through the cylindrical opening and walls to the soil. The inlets and outlets may have molded thereon spouts as 9 and 10 of Figure 4.

Figure 9:
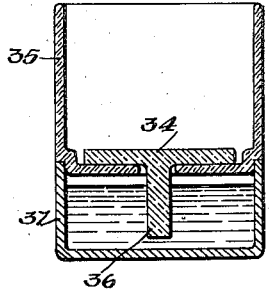
Figure 10:
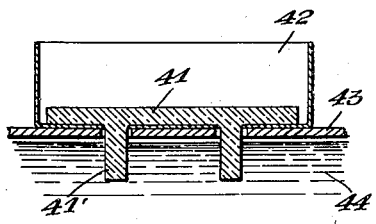

Figures 9 to 15 illustrate special designs of porous wick pieces arranged to transmit water from a reservoir to soil. Figure 9 shows a portable unit for individual operation such as in home or office. The wick piece 34 rests in the bottom of the non-porous soil container 35 as shown with its integral tongue 36 projecting through an opening to the water in the no-porous reservoir 37, which is arranged to fit snugly to the bottom of container 35. Figure 10 shows a flat wick piece 41 forming the bottom of a soil container 42. The projection 41' on the lower side of the wick piece 41 extends through the perforated support 43 to the water reservoir 44.

Figure 11:
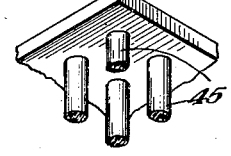

Figure 11 illustrates a bottom view of a flat wick piece in which the water-conducting projections extending into the water supply are in the form of right-circular-cylindrical porous rods 45.

Figure 12:
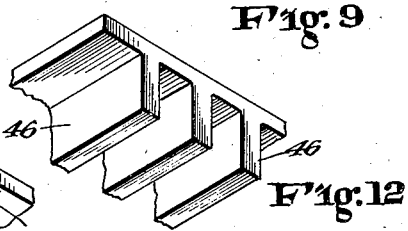

Figure 12 shows a similar view of a flat wick piece but where the water conducting projections are in the form of solid strips 46 extending the length of the underside of the wick piece.

Figure 13 shows a flat wick piece to which water is supplied through an internal hole 47.

Figure 14 shows a wick piece of the same type as that shown in Figure 13 except that the flat wick piece has upward projection 48 which facilitates the distribution of water through surrounding soil. Upward projections can also be used on irrigators of the type shown in Figures 5, 9, 10, 11 and 12.

In all of these forms it will be understood that the wick is formed of any suitable porous material. The irrigator units of Figures 1 to 10 inclusive are shown in vertical cross section. The plan view might be of circular, rectangular, or any other desired shape.

All the cup, cone, tube and double walled pot irrigators supplying water under tension to soil would work better, neglecting for the moment irrelevant wall breaking forces, the thinner the wall. I have found a half millimeter wall will satisfy the non-air-leaking requirement. However, my vacuum-wick types require a wall thick enough that soil in contact with the wall but remote from the water reservoir can be supplied with water by wick action through the wall without requiring a large pressure drop through the wall, i. e., the water path through the wall should have a lower resistance than the water path through the soil.

Figure 15 shows an auto irrigator system for greenhouse use. The porous wick piece 55 shown in elevation is three to five feet wide, is automatically supplied with water by the troughs 56, is supported by the structure 30' and makes possible the building up of tables of any length simply by adding the desired number of the sections 55.

Figures 16 and 17 show a section and elevational view of a single piece irrigator unit having a soil cavity 57 and water storage chamber 58. The unit is made up of porous material and may have any desired ornamental shape. The outer surface is glazed and the water reservoir is filled through the inlet 59.

Figure 18 illustrates an application of my invention for controlling the humidity as in tobacco or film storage containers. It consists simply of a vessel 61 of suitable porosity with a cap 62 closing its neck 63. Its operation is explained hereinafter.

Figures 19 to 24 show devices for supplying or controlling water for irrigators. Figure 19 shows a combination pouring chute and water level indicator for use with irrigators such as shown in Figures 6, 9 and 16. The aluminum strip 64 is bent on the dotted lines (Figure 20) and clamped to the irrigator pot wall 65 as shown. The indicator piece 66 is bent on the dotted lines of Figure 21 and hinged at its lower end to the strip 64 as shown. A cork float 67 is attached to piece 66 so that when the reservoir is filled, the upper end of 66 is drawn into the hole in the wall of the water reservoir. When the water is low, the float sinks and allows the upper end of 66, which acts as an indicator and pouring chute, to protrude through the hole.

Figure 22 shows a simple compact ball cock I have devised for automatically supplying irrigator units like those of Figures 6, 7, 9, 10 and 15 with water. It operates as follows:

When the water is low in the reservoir 68, the ball float 69 drops and the arm 70 opens a suitable valve such as an automobile tire valve 71 and admits water. The valve stem is sealed in the reservoir wall by the gasket 72 and the lock nut 73. Rigid with the outer end of the stem are the cock 74 and the nut 75 for attaching the copper tube 76 which leads to the city water main or an overhead reservoir.

In Figure 23 is shown a pressure reducing valve for supplying irrigator units (like those shown in Figures 1, 2, 3, 4, 5, 8, 13, 14, and 28) with water at controlled pressures less than atmospheric pressure. The brass casting 86 has a pipe thread at the top and is fitted with an automobile tire valve 87 at the bottom. Casting 86 is attached to the city water main or any water supply either by the pipe thread or by the fitting 88 which can be attached to any size pipe simply by boring a hole to take the projection 89. The clamp 90 then holds the fitting 88 and the gasket 91 tightly against the supply pipe. The metal bellows 92 supports the adjustment screw 93. The case 94 fits snugly on the flange 95 on casting 86 and holds in its bottom the pressure indicating pointer 96. The operation is as follows:

Pressure against the extension 97 of the adjustment screw 93 opens the valve 87 and causes the bellows 92 to fill with water which flows through the small copper tube 98 and to the irrigator which has its air outlet closed when its water chamber is completely filled. Loss of water from the irrigator to soil reduces the water pressure in the metal bellows chamber and causes the screw 93 to move up and open the automobile tire valve. The water pressure, or rather the water tension (below the atmospheric pressure) at which the valve opens, is determined by the length of the screw 93 and the thickness of the washer 99. The position of the pointer at 100 is an indication of the water pressure in the auto irrigator.

Figure 28 shows an irrigator unit operating on the same principle as those in Figures 8, 13 and 14 except that the cavity in the unit has only one opening which serves for both air outlet and water inlet. The opening in the pot hole face 109 is higher than it is wide and part way in is notched in the sides so that the cross bar 110 can be inserted in the vertical position and then turned to the horizontal to catch in these notches. The cross bar 110 is drilled and threaded to take the screw 111 which holds the brass fitting 112 firmly against the pot hole face. The gasket 113 makes an air tight seal. The water inlet to the unit is through the small side tube 115 shown in the inset front view. To put the unit into operation, water is admitted through 115 until all the air is forced out, then air outlet 116 is closed by cap 117. For some purposes it will be desirable to have for this air removal process, not the opening 116 and cap 117 arrangement of Figure 28, but a tire valve 119 fitted in a stem 120 as shown in Figure 30. With this arrangement air removal is accomplished simply by admitting water through the inlet tube 115 (Figure 29) until water drips from the opening 118, Figure 30. The valve is arranged so that it will automatically open when the pressure in the irrigator system is greater than atmospheric pressure, and hence will allow all air to be expelled. Then when, for normal operation, the aforesaid water pressure is reduced below atmospheric pressure, the valve remains closed.

Another form of irrigator I have invented is shown in Figure 31. It consists in a flexible porous tube 125 made up of some fibrous capillary material such as asbestos, cotton or ceramic which is imbedded in a wall of flexible material such as rubber, the finished tube resembling garden hose except that the wall is porous. The tube 125 is closed at one end by a plug 126 and clamp 127. The other end is connected to a water supply pipe 128 which may be arranged to connect to any desired number of porous tubes 125. An upward extension 129 of supply pipe 128 is fitted with a valve assembly 131, the same as in Figure 30, and a copper tube 132 leading to a pressure control valve 133 of the same type as shown in Figure 23. 134 is the water main. To put the system of Figure 31 in operation, the tubes 128 and 125 are buried in soil and disposed in such a way that when filled with water, any air in the system will collect in the tube 129. To fill the system with water, the projection 135 is depressed until water flows from the opening 136 in the valve stem 131. An air removal scheme similar to that shown at 116 and 117 of Figure 28 could, of course, also be used instead of the valve stem assembly 131 here shown.

My automatic irrigation inventions operate in accordance with and take advantage of the following capillary and hydrodynamical laws: For any soil at any given moisture content there is a certain definite value of the capillary tension of the soil water. The moisture content of the soil can be controlled by controlling this capillary tension. The gradient of the capillary tension and gravity are the two forces which cause water to move through soil.

The amount of water which in one second crosses a unit area perpendicular to the flow in the soil for unit water moving force is called the capillary conductivity. Because of water film thickness, the capillary conductivity of any porous medium is at its maximum when the medium is saturated.

I have found that at a given moisture condition, different soils may vary as much as five hundred fold in their capillary conductivity. I have discovered that porous ceramic material can be made which when brought in contact with water becomes saturated and remains so even when the water which it contacts is subjected to nearly an atmosphere of tension. Also a wall of such material when wet will support an atmosphere difference in air pressure without leaking.

I have discovered that the aforementioned ceramic material when saturated has higher capillary conductivity than most soils.

My irrigators fall into three general classes which I designate by the terms double-walled, wick and vacuum-wick types.

In this application I disclose new and useful means for arranging connections to said double-walled irrigators and new and improved means (valve shown in Figures 22 and 23) for supplying and controlling the pressure of the water for these units.

In my wick type irrigators, shown in Figures 6, 7, 9, 10, 11, 12, and 15, the water supplying wick comprises all or a substantial part of the soil container. Also the ceramic material is made so that the whole wick remains saturated when any part of it is in contact with free water and has high capillary conductivity and will readily transmit water to the soil where it is needed.

My vacuum wick irrigator units, shown in Figures 8, 13, 14 and 28, take advantage of the self saturating and water transmitting properties of the wick piece, but in addition make it possible to control the tension of the water in the wick and hence the capillary tension and moisture content of adjacent soil. Their ease of manufacture is a considerable advantage over the double-walled types. It is understood, of course, that any of my vacuum-wick irrigators might be made with the water cavity having a single opening as in Figure 28. All the units illustrated have a non-porous or glazed outer surface for the soil container to prevent unwanted evaporation.

With all the above types of auto-irrigation it is desirable to cover the upper surface of the soil with some material such as cork dust, cotton or glass wool which will inhibit soil surface evaporation.

My flexible porous tube is a radical departure from anything that has been used before for plant irrigation and has the advantage of being easy to install in long rows of plants or to wind around ornamental beds. It will not suffer damages from freezing and gives a minimum of trouble from leaky connections.

All of the plant irrigators here described operate to control soil moisture by the following process: When water is removed from soil by the plant roots, there results an increase in the capillary tension of the soil water. This tension change sets up a pressure gradient constituting a water-moving force which acts in such a way as to transmit water from the porous water supplying wall to the soil. Removal of water from the wall likewise sets up a pressure gradient in the saturated wick material which draws water from the free water source supplying the irrigator. If there were no loss of water from the soil, the capillary tension of the soil water would approach that of the supply water at the same level. If static equilibrium is reached, of course there will be a small pressure gradient in the vertical direction which is necessary to balance the gravity force. The distribution of moisture characteristic of the static case is the ideal my types of irrigators approach if the losses of moisture from the soil are small, if the soil has high capillary conductivity, and is at no place far from the moisture supplying surface. For the wick type irrigator the operating capillary tension will be fairly low and will be especially suitable for water-loving plants. For some plants with wick type irrigators it will be desirable to choose coarse, loose soil which will not saturate at the low tension.

For the double-walled and vacuum-wick irrigators, the moisture content of the soil can be maintained at any predetermined value by proper adjustment of the tension in the supply water.

My moisture control unit, shown in Figure 18, operates on the following principle. When the vessel contains water, the walls are saturated but the curvature of the air-water interface at the porous surface depends on the tension of the water in the wall. This curvature in turn controls the pressure of the water vapor in equilibdium with the moist wall. The unit therefore is useful for controlling the humidity of a closed chamber such as a food, tobacco, or film storage chamber. Its operation is as follows: A porous vessel such as that of Figure 18 is filled with distilled water, tightly stopped and placed in the chamber where humidity control is desired. Evaporation from the surface reduces the inside water pressure until either an air leak develops in the porous wall or the internal pressure is reduced to the vapor pressure of water at that temperature. The pressure at which the air leak develops depends on the diameter of the maximum sized pore through the wall, hence, the corresponding pressure of the water vapor at the outer wall may be controlled by controlling the porous structure of the cell. In either case the pressure of the water vapor at the outer surface remains constant until all the water is gone from the inside of the cell. If a large supply of water but small evaporation rate were required, a fraction of the outer surface of the cup could be glazed.

The following composition of ceramic material may be employed for the vacuum wick and other porous ceramic irrigators mentioned in the application:

80 parts of a No. 4 fire clay
20 parts of calcined kaolin

To these may be added the deflocculents, sodium carbonate and sodium silicate as needed (approximately one-half part of each). This porous body may be formed by any of the standard clay working processes and fired to cone one. The flexible walled irrigators can be made by the same process now commonly used for canvas, water hose, garden hose or asbestos steam hose, except that when rubber is employed, a porous, spongy form must be used. I may also employ in my flexible porous irrigators, glass fibers, spun and woven in much the same manner as asbestos and plant fibers now are.

Although I have described one preferred use of my novel system, it will be obvious that it may be for other uses. Thus, for example, automatic irrigators may be employed for growing plants in known nutrient solutions for experimental and commercial producers. In this system the soil is eliminated but a medium for supporting the root structure of plants and means for supplying and controlling the water therefor which contains dissolved therein the plant food is necessary.

Thus, one of my auto irrigators could use instead of soil some porous medium such as quartz sand or cotton or asbestos fiber for supporting the roots. The auto-irrigator would then supply the nutriated solution at the optimum tension to assure the proper oxygen supply around the roots thus giving optimum growing conditions.

I claim:

1. In an auto-irrigator, capillary vacuum wick structures which automatically become saturated when any part of said wick is in contact with liquid.

2. A capillary vacuum wick having porous structure such that said wick saturates when in contact with liquid, remains saturated when the pressure of said liquid is reduced to a predetermined value less than atmospheric pressure.

3. In an auto-irrigator system, a saturated vacuum wick, a water supply therefor and pressure reducing means for controlling the pressure of the liquid in said saturated wick.

4. In an auto-irrigation system, means for supplying soil with moisture at controlled pressure comprising a self-saturating high-conductivity wick piece arranged to support the soil, said wick piece being provided with means for controlling its supply water pressure at a value below atmospheric.

5. A single piece auto-irrigator formed from porous capillary vacuum wick material, said irrigator having a glazed non-porous outer surface and two internal cavities, an upper cavity to serve as the soil container and a lower cavity serving as the water reservoir.

6. A self-saturating high-conductivity vacuum wick piece of any desired shape for supplying moisture to soil, a source of water supply, a pipe connection therefrom to said wick piece, said wick piece being supplied with water, and means for controlling the tension of said water.

7. In combination, an auto-irrigator system having a cell of porous capillary material; a pressure reducing unit for supplying said cell with water at a predetermined tension; and a pressure indicating unit for indicating the pressure at which the water is being fed to the soil.

8. In combination, an auto-irrigator system having a porous capillary unit in contact with soil and a pressure reducing valve for supplying said unit with water at a controlled tension independent of atmospheric pressure.

9. An irrigation system having a water chamber, a normally closed air inlet and outlet connected thereto, means including a collapsing bellows for supplying water under pressure to said water chamber, and means whereby entrapped air in said chamber escapes through said outlet.

10. An irrigation system having a water chamber, air inlet, a source of water supply, an indicator means in said chamber, and a float, said indicator means being controlled by said float in said chamber for indicating the level of said water.

11. In an auto-irrigator system, a porous flexible-walled irrigator, means for supplying water thereto at a predetermined pressure less than atmospheric pressure, said irrigator being disposed at a predetermined depth in soil, and means for plugging one end thereof.

12. An auto-irrigator comprising a capillary cell for containing soil, one of the walls of said cell being made of a porous material and being in contact with a supply of water for conducting said water through the walls of said porous material to said soil, and means for maintaining said water at predetermined pressure below atmospheric, said last means including a valve so disposed that air is automatically excluded from the supply water chamber in the capillary cell whenever water is admitted at a pressure greater than atmospheric pressure.

13. In an auto-irrigation system for soil, a source of moisture supply for said system, means for maintaining said source at predetermined pressure, means for continuously indicating the pressure, a moisture conducting system including a porous medium extending from said source to said soil, and means including said system for supplying the moisture at a rate equal to the absorption of the moisture from the soil.

14. An auto-irrigator comprising a porous flexible-wall irrigator, the walls when wet being permeable to water and impermeable to air to permit the conduction of moisture from the interior of said irrigator to adjacent soil.

15. An auto-irrigator comprising a porous flexible-wall tube composed of a fibrous capillary material, the walls when wet being permeable to water and impermeable to air to permit the conduction of moisture from the interior of said irrigator.

16. An auto-irrigator comprising a porous flexible-wall irrigator composed of a fibrous capillary material embedded in a flexible material, the walls when wet being permeable to water and impermeable to air to permit the conduction of moisture from the interior of said irrigator to soil.

17. An auto-irrigator comprising a porous flexible-wall tube, the walls when wet being permeable to water and impermeable to air to permit the conduction of moisture from the interior of said tube, one end of said tube being closed and the other end being connected to a source of water supply, said tube irrigator being disposed in soil in such a way that air enclosed in the irrigator will rise to the water supply end and can be removed.

18. An auto-irrigator comprising a porous flexible-wall irrigator disposed in soil, the walls when wet being permeable to water and impermeable to air to permit the conduction of moisture from the interior of said irrigator to the soil, one end of said tube being closed and the other end being connected to a source of water supply, and means for controlling the pressure of the water supply from said source.

19. An auto-irrigator comprising a porous flexible-wall irrigator, the walls when wet being permeable to water and impermeable to air to permit the conduction of moisture from the interior of said irrigator, one end of said tube being closed and the other end being connected to a source of water supply, and means for controlling the pressure of the water supply from said source, and means for permitting the escape of any gas which may collect in the irrigator.

20. In an auto-irrigator system a porous flexible-wall irrigator, means for supplying water thereto at a predetermined pressure less than atmospheric pressure, said irrigator being disposed at a predetermined depth in the soil, and means for controlling pressure supply thereto.

21. In an auto-irrigator system operating through a porous flexible-wall irrigator the method of filling the irrigator with water which comprises feeding water thereto from a supply at a pressure less than atmospheric pressure, and providing an overflow line to permit the escape of entrapped air.

22. An auto-irrigator comprising a porous flexible-wall irrigator, the walls being permeable to water and impermeable to air to permit the conduction of moisture from the interior of said irrigator, one end of said tube being closed and the other end being connected to a source of water supply at a pressure less than atmospheric pressure.

23. An irrigator unit having one or more chambers for containing soil and a water storage chamber, said unit being made of porous material, the outer surface being made impermeable to water and a floating mechanism in said water storage chamber for providing a water level indication.

24. An irrigator unit having a chamber for containing soil and a water storage chamber, said unit being made of porous material, the outer surface being made impermeable to water, the wall separating said soil chamber and water storage chamber being pervious to water and a floating mechanism in said water storage chamber for providing a water level indication.

25. An irrigator unit having a chamber for containing soil and a water storage chamber, said unit being made of porous material, the outer surface being made impermeable to water, the wall separating said soil chamber and water storage chamber being pervious to water, and an opening in said water reservoir for permitting the admission of water therein and a floating mechanism in said water storage chamber for providing a water level indication.

26. An irrigator unit having a chamber for containing soil and a water storage chamber, said unit being made of porous material, the outer surface being made non-porous, and a floating water level indicator in cooperative relation with the water in said chamber for indicating the level of the water in the storage chamber.

27. A single piece irrigator unit having a chamber for containing soil and a water storage chamber, said unit being made of porous material, the outer surface being made impermeable to water, the wall separating said soil chamber and water storage chamber being pervious to water, and permitting capillary wick action, and an opening in said water reservoir for permitting the admission of water therein, and a water level indicator having an arm protruding through said opening for indicating the level of the liquid therein.

28. A single piece irrigator unit having a chamber for containing soil and a water storage chamber, said unit being made of porous material, the outer surface being made impermeable to water, the walls connecting said soil chamber and water storage chamber permitting capillary wick action, and an opening in said water reservoir for permitting the admission of water therein, and a water level indicator having an arm protruding through said opening for indicating the level of the liquid therein, said indicator comprising a float, a pivoted support therefor and an extension from said support.

29. A porous auto-irrigator unit for supporting soil, the thickness of its walls and permeability being such that the pressure drop of the water in passing through the unit is less than the pressure drop through the soil.

30. A self-irrigating soil container having a cylindrical opening through its base and provided with a water inlet and water outlet.

31. A porous auto-irrigator unit for supporting soil comprising a capillary vacuum wick structure having a supply water cavity, a source of water supply connected to said cavity and pressure reducing valves for supplying water to said cavity at a pressure less than atmospheric pressure.

32. A self-irrigating soil container comprising a capillary vacuum wick structure having a water cavity, a source of water supply connected to said cavity and pressure reducing valves for supplying water to said cavity at a pressure less than atmospheric pressure, said pressure valve comprising a member operating in accordance with the pressure of said water supply.

33. In an auto-irrigation system, a source of water supply at a predetermined pressure different from that necessary for the auto-irrigation system; an auto-irrigator unit connected to said source; and means comprising a pressure reducing valve for maintaining the water from said source in said unit at a predetermined value less than atmospheric pressure.

34. In an auto-irrigation system, a source of water supply of a pressure in excess of that necessary for the auto-irrigation system; an auto-irrigator unit connected to said source; and means comprising a pressure reducing valve for maintaining the water from said source in said unit at a predetermined value less than atmospheric pressure.

35. A moisture supplying, self-saturating vacuum wick piece for controlling soil moisture, said wick piece itself serving as a soil holder for growing plants.

LORENZO ADOLPH RICHARDS.